No. 640,025. Patented Dec. 26, 1899.
F. P. PRINDLE.
CYCLOMETER.
(Application filed Apr. 10, 1899.)

(No Model.) 2 Sheets—Sheet 1.

Witnesses
Chas. J. Williamson,
Jas. E. Hutchinson.

Inventor
Frank P. Prindle
by Prindle & Russell
his Attorneys

THE NORRIS PETERS CO., PHOTO-LITHO., WASHINGTON, D. C.

No. 640,025. Patented Dec. 26, 1899.
F. P. PRINDLE.
CYCLOMETER.
(Application filed Apr. 10, 1899.)
(No Model.) 2 Sheets—Sheet 2.
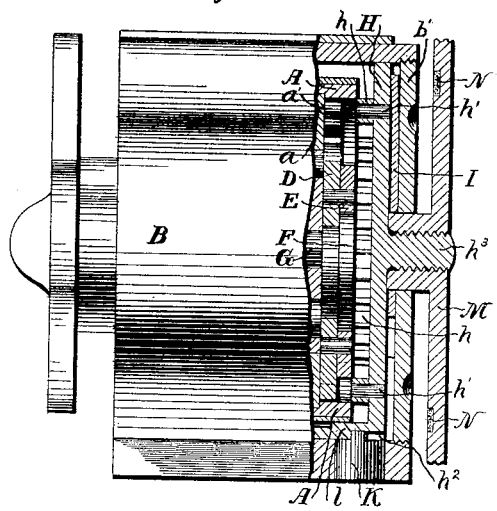
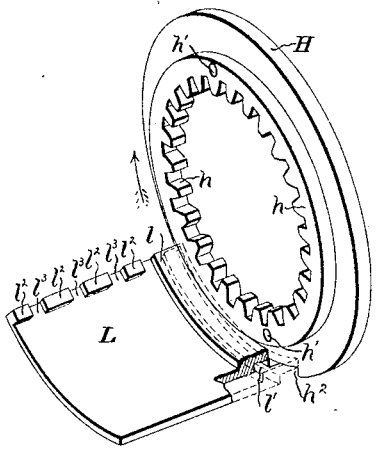
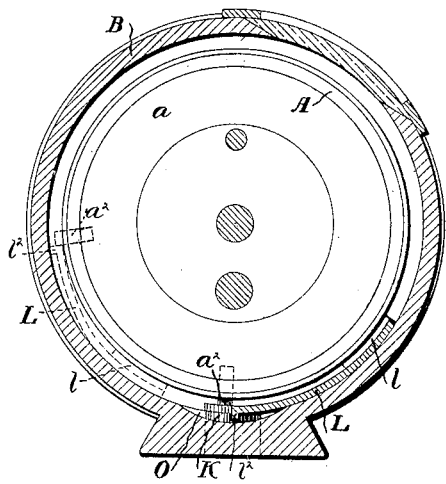
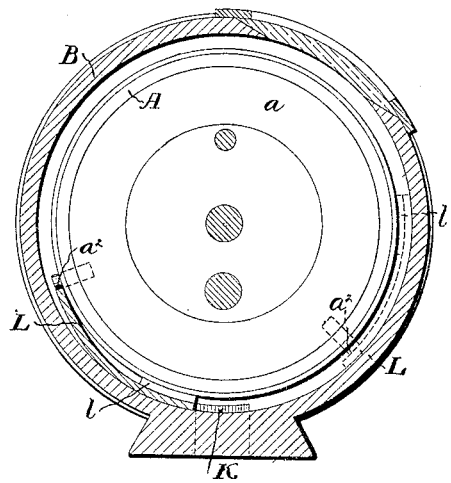
Witnesses.
Chas J Williamson
Jas E Hutchinson
Inventor.
Frank P. Prindle
by Prindle and Russell
his Attorneys

UNITED STATES PATENT OFFICE.

FRANK P. PRINDLE, OF WASHINGTON, DISTRICT OF COLUMBIA, ASSIGNOR TO THE VEEDER MANUFACTURING COMPANY, OF HARTFORD, CONNECTICUT.

CYCLOMETER.

SPECIFICATION forming part of Letters Patent No. 640,025, dated December 26, 1899.

Application filed April 10, 1899. Serial No. 712,501. (No model.)

*To all whom it may concern:*

Be it known that I, FRANK P. PRINDLE, of Washington, in the District of Columbia, have invented certain new and useful Improvements in Cyclometers; and I do hereby declare that the following is a full, clear, and exact description thereof, reference being had to the accompanying drawings, in which—

Figure 1:
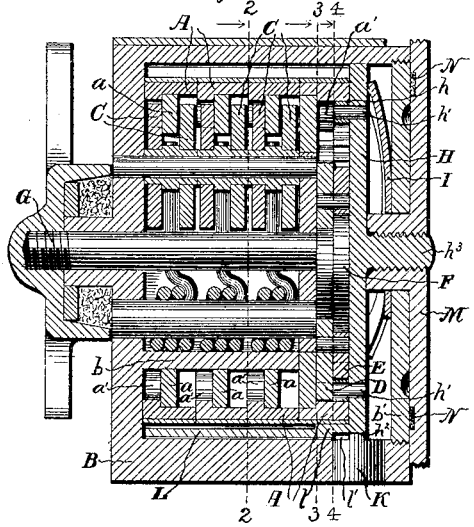
Figure 2:
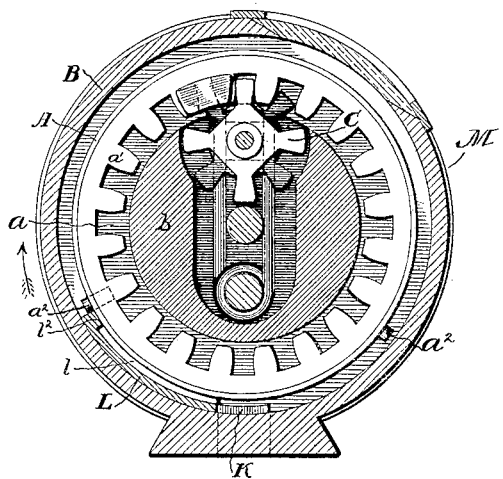
Figure 3:
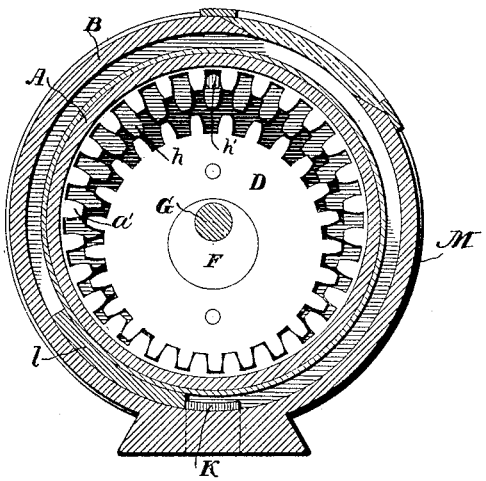
Figure 4:
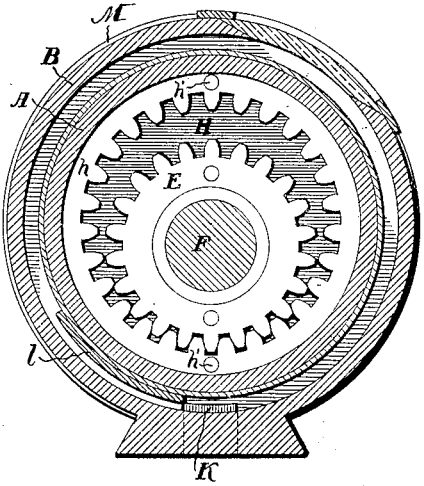

Figure 1 is a longitudinal section of a cyclometer embodying my invention. Fig. 2 is a section on the line 2 2 of Fig. 1, the lug carried by the index-ring and the star-wheel with which it operates being also shown; Fig. 3, a like section on the line 3 3; Fig. 4, a cross-section on the line 4 4; Fig. 5, a view of the cyclometer, partly in elevation and partly in section, showing the parts in zero-setting position; Fig. 6, a perspective view of the zero-setting disk and pawls; Fig. 7, a cross-section of the cyclometer, showing a modification of the pawls; and Fig. 8, a similar section of the same, in which is shown another modification of the pawls.

Letters of like name and kind refer to like parts in each of the figures.

The object of my invention is to provide a simple and efficient means for setting the indexes of cyclometers to zero; and to such end said invention consists in the mechanism substantially as and for the purpose hereinafter described.

My invention can without material change be adapted to various constructions of cyclometers. As shown in the accompanying drawings it is applied to a cyclometer such as that shown in United States Patent No. 548,482, issued October 22, 1895, to C. H. Veeder for a cyclometer, in which are employed a series of index-rings A and A, mounted upon a hub $b$ on the casing B, motion from one to another of which is transmitted by transfer-wheels C and C. Each transfer-wheel C consists of a sleeve having a pinion at one end and a star-wheel at the other end, the sleeve between the pinion and star-wheel being flattened. The ends of a spring J bear against the flattened sides of the sleeve and yieldingly hold it from rotation. For a full description of these parts of the cyclometer I refer to said patent.

In adapting my invention to the Veeder cyclometer I place the bearing-ring $a$ of the first index A at the inner end of the latter or next to the second index, and, as in the Veeder cyclometer, I give motion to the first index by means of differential gears D and E, journaled on an eccentric F upon the inner end of the driving-shaft G. Said eccentric is stepped, as shown, to confine the gears against movement axially and also through the larger gear D to similarly hold the first index while setting to zero. The teeth $a'$ of the first index are on the inside thereof and are preferably formed integral therewith, and with said teeth I mesh the larger gear D. The other gear E is meshed with a gear $h$ on the inner face of the disk H. Said gear $h$ can be made in any suitable way; but a good construction is a ring having teeth on the inner periphery and secured to the disk by pins $h'$ and $h'$. Said ring is of such a diameter that it will enter the end of the first index when the disk H is against the end of said index. The disk H is as large in diameter as the inside of the casing B and is normally held against the end of the first index by a spring I, interposed between the disk and end $b'$ of the casing B. In order to hold said disk and gear $h$ upon the same from turning when not used for zero-setting, a notch $h^2$ is made in its periphery, which engages a pin K in the lower part of the casing B. Between the indexes and casing an arm or pawl L, adapted to coöperate with a radial pin $a^2$ in the periphery of each index, extends from the disk to the other end of the casing. That part $l$ of said arm next to the disk is made as thick as the space between the indexes and casing and extends longitudinally to the pin $a^2$ in the first index and has on its outer periphery a notch or groove $l'$, cut adjacent to the face of the disk and parallel to the same, the width of which notch or groove is such that it can pass over the pin K when in position to do so. The rest of the arm is preferably made one-half as thick as the part $l$ and has on one side a series of lugs or projections $l^2$, separated by notches $l^3$, there being a lug for each index to form a pawl to engage the pin $a^2$ thereof, as set forth hereinafter. The arm L is made wide enough to withstand the strain or pressure of the pins $a^2$ upon the lugs $l^2$ when setting to zero and is preferably placed in such a position that the notch or groove $l'$ will be in front of the pin K when said arm is in its inoperative position, thus providing a stop for the outward longitudinal movement of the disk H and parts attached to it. As shown, the arm L is integral with the disk H; but of course these two parts can be separately made and then joined. Upon the outer face of the disk H is a threaded hub or boss $h^3$, that extends through the end $b'$ of the casing and upon which is secured a knurled cap M, that is yieldingly held against the face of the end $b'$ by action of the spring I. A washer N can be put in the inner face of said cap to prevent dust from getting into the casing.

To set the indexes at zero, the cap M is seized at its rim or periphery and pulled outward in an axial direction against the pressure of the spring I, carrying with it the disk H, gear $h$, and arm L, all of which are attached to it, and the outward movement being continued until it is arrested by the arm L engaging the pin K, the parts then being in the position shown in Fig. 5. As the result of this action the gear $h$ is disengaged from the gear E, the pin K and notch $h^2$ disengaged, the pin K and the groove $l'$ placed in alinement, so that said pin will be no obstacle to the turning of the cap and its attached parts, and the lugs $l^2$ and $l^2$ are placed in alinement with the respective pins $a^2$ and $a^2$ on the indexes. The remainder of the mechanism—that is, the gear D, the indexes, and the transfer-wheels—does not have its position disturbed; but as there is only the engagement of the gear D with the first index-teeth $a'$ and the transfer-wheels are of the common form, comprising two toothed members that respectively engage teeth on adjacent index-wheels, it is apparent that as the cap M is rotated there is nothing to prevent the indexes being turned by the engagement of the lugs $l^2$ and $l^2$ of the cap-arm L with the pins $a^2$ and $a^2$ of the indexes. As all of the indexes move in the same direction, the transfer-wheels merely turn idly. The rotation of the cap M, which is in the direction of the arrow, Fig. 2, is continued until the notch $h^2$ is brought in line with the pin K, at which point the indexes are all brought to zero, whereupon, the spring I being permitted to act, the cap, with its attached parts, is moved axially inward, again engaging the notch $h^2$ and the pin K, placing the lugs $l^2$ and $l^2$ out of the path of the index-pins $a^2$ and $a^2$, and restoring the engagement of the gear $h$ and the gear E.

It is evident that other forms of pawls than the ones shown in Figs. 1 to 6 can be used. Thus in Fig. 7 the pawls are made in the form of a single rib $l^2$ on a spring-arm L, the rib being bent outward to project the same distance as the part $l$. In its inoperative position the rib $l^2$ projects into a groove or notch O, formed longitudinally in the casing, and the arm L is held against the casing by the pressure of the spring-arm L, so that the pins $a^2$ can pass over it. When setting the indexes to zero, the rib $l^2$ passes out of the groove O and enters the space between the indexes and casing and engages the pins $a^2$ and carries them along with it, as indicated in dotted lines.

In Fig. 8 the pawl L is in the form of a spring, one for each index, and is of such a thickness that the pins $a^2$ can pass over them, as shown in dotted lines. These springs are bent inward, tending to press against the faces of the indexes, or made so that they will come very near to said faces without touching them. The zero-setting is accomplished in the same manner as with the other constructions hereinbefore described, the pawls carrying the pins and indexes with them until returned to their inoperative position.

Having thus described my invention, what I claim is—

1. In a register, the combination of a series of index-rings having a common axis, transfer mechanism contained within said rings, projections on the outer peripheries of said rings, and a rotary part adapted to engage said projections and set the indexes to zero, substantially as and for the purpose described.

2. In a register, the combination of a series of rotatable indexes, means for rotating the same step by step that include a gear-wheel and an internally-toothed ring, a rotary and axially-movable part carrying said ring, means for transmitting the rotary movement of said part to the indexes to move them to zero, and means for moving said part axially, substantially as and for the purpose described.

3. In a register, the combination of a series of rotatable indexes, means for rotating the same step by step that include a shaft, two gear-wheels carried thereby, and two internally-toothed rings meshing respectively with said gears, a disk carrying one of said rings, an arm projecting from the disk, pins on the indexes adapted to be engaged by the arm, and means for moving the disk both axially and circumferentially, substantially as and for the purpose described.

4. In a register, the combination of a series of rotatable indexes, means for moving the same step by step, that include a gear, a rotary and axially-movable part carrying said gear, and which when moved axially renders said gear inoperative, an arm projecting from said part lying along the periphery of the indexes, and having a series of projections alternating with spaces, a peripheral projection on each index, a stop-pin with which a notch in said rotary part is adapted to engage, and a spring normally holding said part so that its notch engages the pin, substantially as and for the purpose shown.

5. In a register, the combination of a series of rotatable indexes, means for moving the same step by step that include a gear, a disk to which said gear is attached, said disk also having formed thereon or attached thereto an arm curved around the periphery of the indexes, said arm having a series of lugs alternating with spaces, a pin on each index and means attached to said disk whereby the disk, gear, and arm may be moved laterally to disengage the gear and to place the lugs on the arm in line with the pins on the indexes, substantially as and for the purpose described.

In testimony that I claim the foregoing I have hereunto set my hand this 6th day of April, 1899.

FRANK P. PRINDLE.

Witnesses:
JOSEPH L. WOLFE,
H. STANLEY FINCH.